(No Model.)

T. H. SPARKS.
ANIMAL POKE.

No. 471,149. Patented Mar. 22, 1892.

Witnesses
C. J. Williamson.
P. J. Rogers.

Inventor
Thos. H. Sparks
by Franklin H. Hough
atty.

UNITED STATES PATENT OFFICE.

THOMAS H. SPARKS, OF STEELE CITY, NEBRASKA.

ANIMAL-POKE.

SPECIFICATION forming part of Letters Patent No. 471,149, dated March 22, 1892.

Application filed August 18, 1891. Serial No. 403,040. (No model.)

*To all whom it may concern:*

Be it known that I, THOMAS H. SPARKS, a citizen of the United States, residing at Steele City, in the county of Jefferson and State of Nebraska, have invented certain new and useful Improvements in a Combined Animal-Poke and Calf-Weaner; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in animal-pokes or devices designed to prevent cattle from going through wire-fences; and it has for its objects, among others, to provide an improved device of this character which shall be light, simple, cheap, and efficient, and durable, and which can be easily and quickly adjusted to the animal, and which shall be capable, also, of serving as a calf-weaner. I form the device of wire of sufficient strength and make the yoke adjustable for animals of different sizes. I provide novel means for accomplishing this adjustment. I provide a simple attachment for preventing sucking of the animals. The two parts are detachably held together, so they may be readily detached when desired.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1:
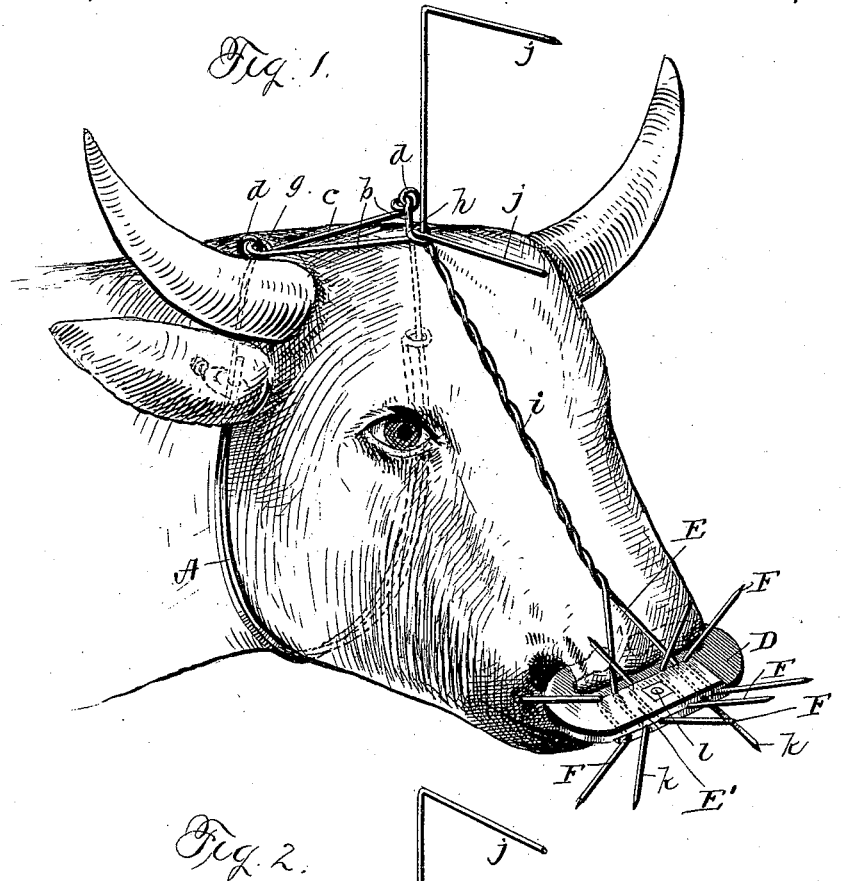
Figure 2:
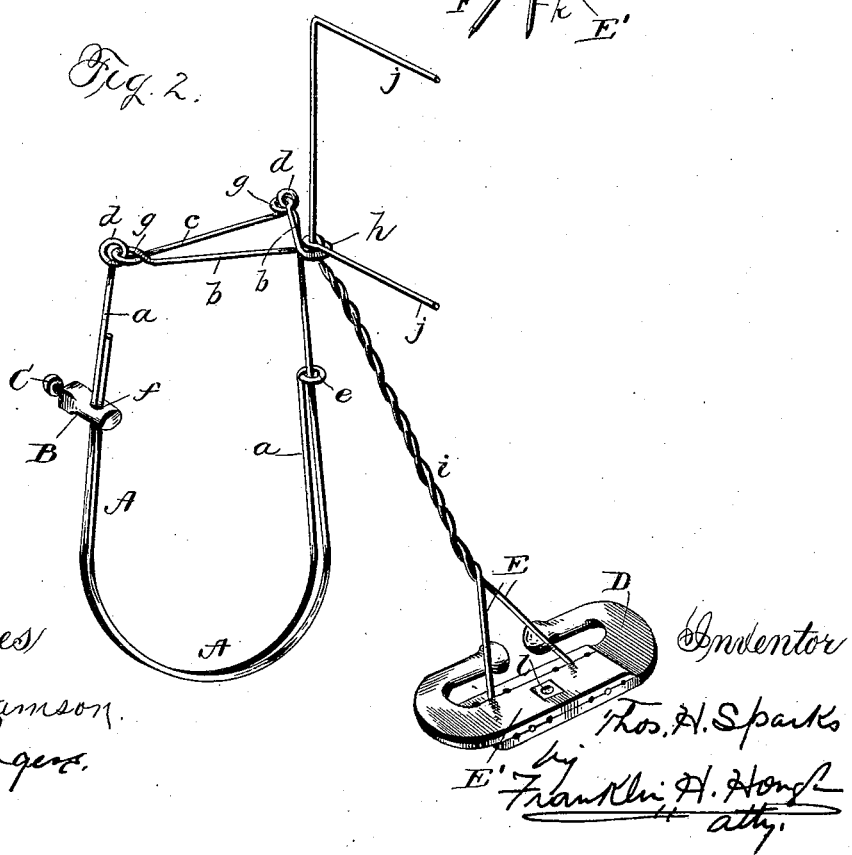

Figure 1 is a perspective view of my improved device complete in position upon an animal. Fig. 2 is a side elevation of the device when fitted as a poke simply.

Like letters of reference indicate like parts in both views where they occur.

Referring now to the details of the drawings by letter, A designates the neck-yoke, which is constructed of a wire, which I have designated by the letters $a$ and $b$ in order to more readily distinguish it. The wire $a$, which forms the yoke proper, is bent to form the cross portion or horizontal bar $c$, which at its ends is formed with the loops or eyes $d$. The wire is then bent around in the form of a yoke with the two ends extending in substantially parallel planes, one end being formed into a loop or eye $e$, which embraces the other portion of the wire, as clearly shown. The other end of the wire is not formed with a loop or eye but is inserted in the opening $f$ in the block B, through which opening the adjacent portion of the yoke passes, and a set-screw C is provided, which passes endwise through the block and into the opening therein to bear against the free end of the wire and force it against the other portion to hold the parts in their adjusted position. Loosening of the screw permits me to adjust the yoke to different sizes of animals. The parallel portions also render the yoke easier to the neck of the animal than a single wire would be. The wire $b$ has its ends formed with loops or eyes $g$, which engage the loops or eyes $d$ of the wire $a$, as shown, and this wire $b$, together with the cross-bar of the yoke forms a triangle and the wire $b$ at its center is formed with a loop or eye $h$, as shown, for a purpose which will soon appear.

D is the nose-plate. It may be of any desired shape, in this instance being shown as substantially rectangular, and it is held by the wires E, which are twisted, as shown at $i$, and their rear ends bent to form hooks $j$, while their forward ends are passed through recesses between the rear face of the nose-plate and the detachable plate E', and extend beyond the nose-plate to form spurs $k$, as shown, the plates being held together by the screw-bolt $l$, which may be readily loosened when it is desired to separate the parts.

F are short wires held in recesses between the two plates and their ends extended to form spurs, as shown.

The operation will be apparent from the drawings when taken in connection with the above description. The nose-plate is engaged with the yoke by passing the hook thereof through the central eye or loop of the wire $b$, as shown in Fig. 1, and the yoke adjusted to the neck of the animal. The loose engagement of the wire of the nose-plate with the yoke allows freedom of movement of the parts.

When it is desired not to have the spurs, they are easily removed by loosening the bolt that holds the plates, removing the short wires, and cutting off the spurs on the ends of the longer ones.

What I claim as new is—

A combined animal-poke and calf-weaner comprising an adjustable yoke, a nose-plate provided with spurs retained between the plates forming the same, and with knobs for insertion into the nostrils, connecting-wires between the yoke and nose-plates, said wires being extended to form spurs above and in front of the head of the animal, as set forth.

In testimony whereof I affix my signature in presence of two witnesses.

THOMAS H. SPARKS.

Witnesses:
 JOHN B. SMITH,
 B. E. PICKERING.